US005601674A

United States Patent [19]
Szweda et al.

[11] Patent Number: 5,601,674
[45] Date of Patent: Feb. 11, 1997

[54] FIBER REINFORCED CERAMIC MATRIX COMPOSITE MEMBER AND METHOD FOR MAKING

[75] Inventors: Andrew Szweda, Middletown; Michael L. Millard, Sharonville, both of Ohio; Michael G. Harrison, Bear, Del.

[73] Assignee: General Electric Company, Cincinnati, Ohio

[21] Appl. No.: 473,391

[22] Filed: Jun. 7, 1995

Related U.S. Application Data

[62] Division of Ser. No. 341,339, Nov. 16, 1994, Pat. No. 5,488,017, which is a continuation of Ser. No. 129,002, Sep. 28, 1993, abandoned, which is a continuation of Ser. No. 740,549, Aug. 5, 1991, abandoned, which is a continuation-in-part of Ser. No. 341,000, Apr. 14, 1989, abandoned.

[51] Int. Cl.$^6$ .................................................. C04B 38/00
[52] U.S. Cl. .................. 156/89; 264/60; 264/63; 264/65; 501/80; 501/95
[58] Field of Search ................. 156/89; 264/60, 264/63, 65, 241, 258, 257; 501/95, 133, 80

[56] References Cited

U.S. PATENT DOCUMENTS

| | | | |
|---|---|---|---|
| 3,549,393 | 12/1970 | Elarde | 106/39 |
| 4,375,516 | 3/1983 | Barrall | 501/84 |
| 4,432,798 | 2/1984 | Helferich et al. | 106/38.3 |
| 4,460,638 | 7/1984 | Haluska | 156/89 X |
| 4,460,640 | 7/1984 | Chi et al. | 156/89 X |
| 4,504,591 | 3/1985 | Feagin | 501/102 |
| 4,568,594 | 2/1986 | Hordonneau et al. | 428/113 |
| 4,668,590 | 5/1987 | Yamamoto et al. | 428/446 |
| 4,680,048 | 7/1987 | Motoki et al. | 65/17 |
| 4,737,192 | 4/1988 | Smith | 106/85 |
| 4,837,230 | 6/1989 | Chen | 501/88 |
| 4,840,763 | 6/1989 | Freitag | 264/65 |
| 4,861,646 | 8/1989 | Barringer et al. | 428/120 |
| 4,897,370 | 1/1990 | Horiguichi et al. | 501/5 |
| 4,917,941 | 4/1990 | Hillig et al. | 428/283 |
| 4,919,991 | 4/1990 | Gadkaree | 428/113 |
| 5,134,020 | 7/1992 | Cotteret et al. | 428/212 |

FOREIGN PATENT DOCUMENTS

| | | |
|---|---|---|
| 0130105 | 1/1985 | European Pat. Off. . |
| 0361356 | 4/1990 | European Pat. Off. . |
| 1353384 | 5/1974 | United Kingdom . |
| 2033972 | 5/1980 | United Kingdom . |
| 2175893 | 12/1986 | United Kingdom . |
| 2230259 | 10/1990 | United Kingdom . |

*Primary Examiner*—David A. Simmons
*Assistant Examiner*—M. Curtis Mayes
*Attorney, Agent, or Firm*—Andrew C. Hess; David L. Narciso

[57] ABSTRACT

A method for making an environmentally stable, fiber reinforced ceramic matrix composite member includes use as a bonding agent of a ceramic precursor which transforms upon heating to a ceramic phase. The ceramic phase bonds together discontinuous material comprising ceramic particles, and reinforcing fibers at a relatively low processing temperature.

18 Claims, 2 Drawing Sheets

1. UNREINFORCED MATRIX
2. REINFORCED MATRIX
3. REINFORCED MATRIX WITHOUT CERAMIC PRECURSOR

FIBER REINFORCED CERAMIC MATRIX COMPOSITE MEMBER AND METHOD FOR MAKING

This application is a divisional of U.S. patent application Ser. No. 08/341,339, filed Nov. 16, 1994, now U.S. Pat. No. 5,488,017 which is a continuation of U.S. patent application Ser. No. 08/129,002, filed Sep. 28, 1993, now abandoned, which is a continuation of U.S. patent application Ser. No. 07/740,549, filed Aug. 5, 1991, now abandoned, which is a continuation-in-part of application Ser. No. 07/341,000, filed Apr. 14, 1989, now abandoned. This application is related to U.S. patent application Ser. No. 07/866,944, now U.S. Pat. No. 5,306,554, which is a continuation of U.S. patent application Ser. No. 07/341,001, now abandoned, which was filed concurrently with the parent application, U.S. patent application Ser. No. 07/341,000.

This invention relates to ceramic composite members and method for making, and, more particularly in one form, to ceramic fiber reinforced ceramic matrix composite members.

BACKGROUND OF THE INVENTION

Use of ceramics in the form of high temperature operating articles, such as components for power generating apparatus including automotive engines, gas turbines, etc., is attractive based on the light weight and strength at high temperatures of certain ceramics. One typical component is a gas turbine engine strut. However, monolithic ceramic structures, without reinforcement, are brittle. Without assistance from additional incorporated, reinforcing structures, such members may not meet reliability requirements for such strenuous use.

In an attempt to overcome that deficiency, certain fracture resistant ceramic matrix composites have been reported. These have incorporated fibers of various size and types, for example long fibers or filaments, short or chopped fibers, whiskers, etc. All of these types are referred to for simplicity herein as "fibers". The intent of including such fibers within the ceramic matrix was to make the matrix resistant to brittle fracture behavior. However, such fibers are not particularly effective in ceramic matrix composites where there is a strong bond between the fibers and the matrix. Such behavior may be attributed to the extremely high strain concentration existing at the tip of a brittle crack in the matrix, and the fact that the stress developed at such a strain concentration is high enough to fracture an individual reinforcing fiber; as each individual fiber is fractured, the load is transferred to the next fiber, and the fracture process is repeated sequentially until the crack has progressed across the entire section. In contrast, if the bond between the reinforcing fibers and the matrix is slightly weaker, the concentrated load at a crack tip causes localized separation of the fiber from the matrix, allowing the fiber to deform elastically over a somewhat greater portion of its length, simultaneously transferring a portion of the load to adjacent fibers.

Some fibers have been coated with certain materials which have been applied to prevent strong bonding between the reinforcement and matrix. However, some coatings are of carbon, or forms of carbon, or other material which will oxidize if exposed to air at an intended elevated operating temperature. Such exposure could occur if there would be microcracks in the matrix.

Oxidizing fibers, such as carbon, are potentially useful as reinforcement in ceramic composites, except that the system can become environmentally unstable in use; cracks in the ceramic matrix, even microcracks, can make the oxidizable fiber available to contact with oxygen in air at elevated operating temperatures experienced in the hot sections of power producing engines. Such oxidation of reinforcing fibers weakens or destroys the fiber structure or its function, leading to unacceptable weakening of the structural member.

Another problem relates to the fact that high sintering temperatures for ceramic particles about reinforcing fibers limit the kind of fibers which can be used. For example, many fibers deteriorate above about 1000° C., well below required ceramic particle sintering temperatures.

There is another problem which may be encountered in the manufacture of ceramic matrix composite members. Rigid binders are commonly employed to maintain matrix particles and reinforcing fibers in their respective positions while the member is heated sufficiently to bond them together to form the member. Such binders do not permit the flow of matrix material to fill massive voids which might occur within the laid up structure of the member.

SUMMARY OF THE INVENTION

Briefly, in one form, the present invention provides a method for making an environmentally stable, fiber reinforced ceramic matrix composite member comprising oxidation stable reinforcing fibers, for example ceramic fibers, and a matrix interspersed about the fibers. As used herein, "oxidation stable" in respect to fibers means fibers which substantially will not experience substantial oxidation and/or environmental degradation, at intended operating conditions of temperature and atmosphere, such as air. The matrix is a mixture including ceramic particles bonded together with a ceramic phase. The ceramic particles and the ceramic may be the same material, or different materials.

In the method form, the present invention provides a polymer substance, which transforms upon heating to yield a ceramic phase, and ceramic particles, both of which are mixed in a liquid vehicle to form a substantially uniform distribution in a matrix mixture slurry. This slurry is interspersed about the oxidation stable fibers, as a matrix mixture, to provide a prepreg element. Such a prepreg element (or a plurality of prepreg elements) is molded under the influence of heat and pressure to form a prepreg preform, which is a polymer matrix composite member that is readily handled. The preform is subsequently heated in an oxidizing atmosphere, such as air, at a second processing temperature, at least at the temperature required to transform the polymer substance to a ceramic phase and less than that which will result in degradation of ceramic fibers in the preform. Through the present invention, such temperature can be in the range of about 600°–1400° C., depending on the nature of the reinforcing fibers. Such heating transforms the polymer substance, such as by decomposition, to a ceramic phase, for example of preferably crystalline-form, which bonds together the ceramic particles from the slurry into a ceramic matrix about the fibers. Because components of this reinforced, ceramic matrix composite member are stabilized in an oxidizing atmosphere, preferably being substantially all ceramic oxides bonded together, the member is environmentally stable. Because the matrix contains a controlled amount of porosity, which effectively controls the strength of the matrix and the strength of the bond between the reinforcing fibers and the matrix, the member exhibits both high strength and high resistance to fracture.

DESCRIPTION OF THE PREFERRED EMBODIMENTS

Figure 1:
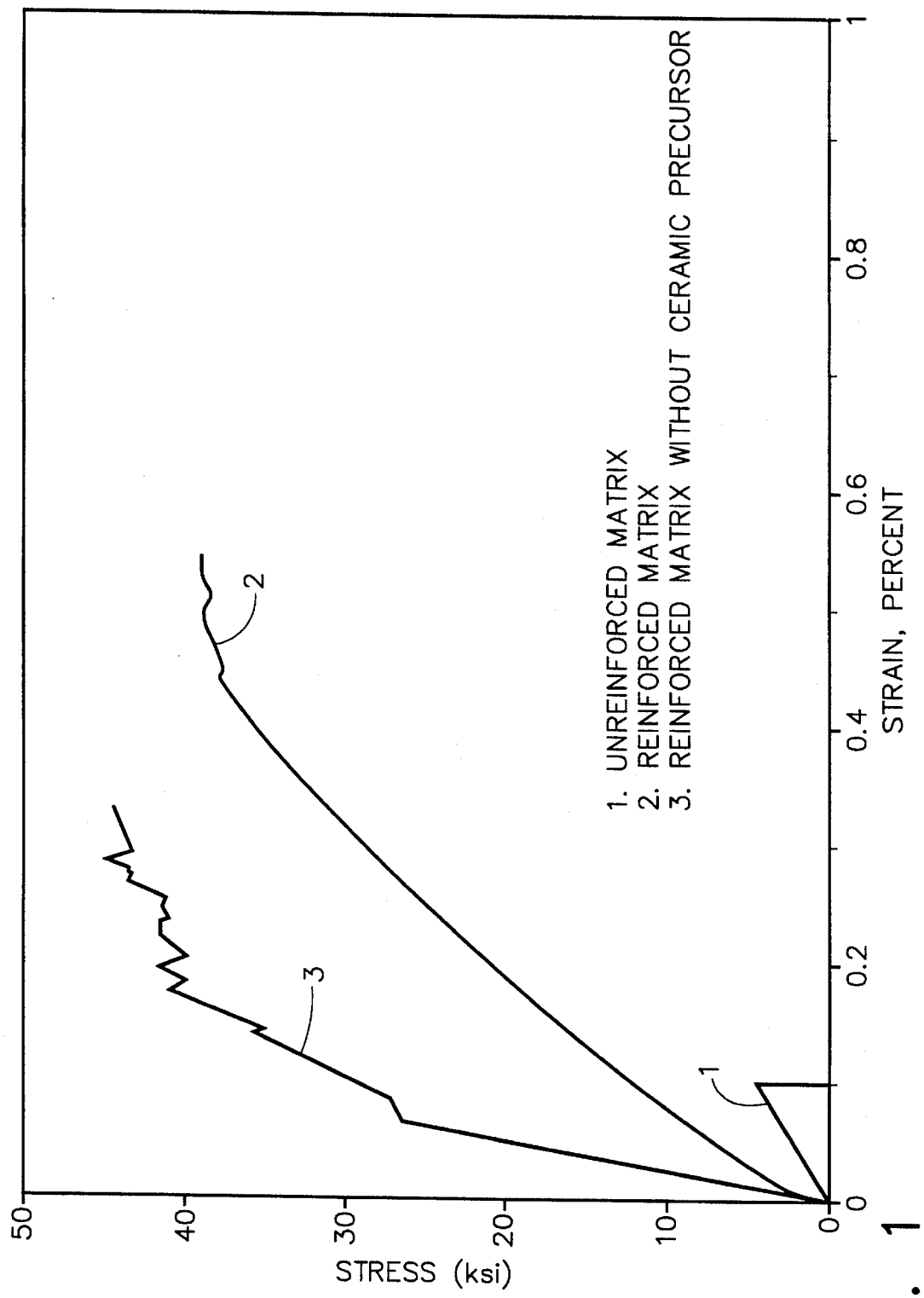
FIG. 1 is a graphical comparison of fracture resistance data for an unreinforced matrix, another reinforced matrix and a composite, reinforced member of the present invention.

Fracture resistant, fiber reinforced ceramic matrix composites offer the designers of high temperature components for power generating engines, such as components for automotive engines, turbine engines, etc., an opportunity to specify strong, lightweight members. However, certain of such known composites are environmentally unstable upon the occurrence of cracks which expose oxidizable portions to air. In addition, certain known processing results in undesirable levels of porosity, or massive voids, in the product. Within the context of the present invention, either too much or too little porosity is undesirable. One form of the present invention provides a method for controlling the porosity in the matrix of a ceramic matrix composite material.

A common method for producing ceramic composite articles such as grinding wheels involves joining ceramic particles with glassy or vitreous material. In this method the entire article must be heated to a high temperature that the matrix portion of the article is made liquid enough to wet the particles being joined. In the context of the present invention, such high temperatures may cause deterioration of reinforcing fibers. Also, at such high temperatures the vitreous matrix material may react with and damage the reinforcing fibers it contacts. Further, a vitreous bond between the fibers and the matrix may be so strong as to lessen the effectiveness of the fibers in toughening a ceramic matrix composite material. The present invention provides a method for controlling the extent of vitrification in a ceramic matrix composite.

The present invention provides improved methods for avoiding such known problems and for making an environmentally stable reinforced ceramic matrix composite member of high strength and high fracture resistance at lower processing temperatures. A principal basis for the invention is providing ingredients which can be stabilized at a lower temperature; and, after a stabilizing heating, one product is a member preferably having substantially all ceramic oxides bonded together. Use of such ingredients eliminates the potential for member deterioration in use due to oxidation.

Typical of the ceramic particles used for ceramic matrices are the oxides of such elements as Al, Si, Hf, Y and Zr, and their mixtures and combinations. Such commercially available materials include $Al_2O_3$, $SiO_2$, $ZrO_2$, $HfO_2$, $3Al_2O_3 \cdot 2SiO_2$, $Y_2O_3$, $CaO \cdot Al_2O_3$ and various clays. Ceramic particle sizes in the range between about 75 microns to 0.2 micron in diameter have been tested as a matrix ingredient in the evaluation of the present invention. One form of the present invention addresses the fact that each of such ceramics, when used as a structure, will shrink when fired to an elevated consolidating temperature. For example, a form of alumina will experience a linear shrinkage in the range of about 3–4% at 1400° C.

Evaluated in connection with the present invention were a variety of ceramic precursors, which can be used as a matrix precursor as well as an infiltrant precursor, as described later herein. It was found that use of one such class of precursor, namely, silicone resins, is particularly useful in making ceramic matrix composite members. Silicon-containing materials, including such materials as polycarbosilanes, vinylic polysilane, dimethyl siloxane, and silicone resins, first form a polymer matrix which supports the ceramic particles and the reinforcing fibers prior to bonding, and then transforms to yield silica, which bonds the ceramic particles and reinforcing fibers together. The transformation also yields gaseous products which contribute to the formation of fine porosity in the matrix. The transformation takes place at a significantly lower processing temperature than is generally required for vitrified bonding processes, which minimizes the likelihood of damage to the fibers by the matrix material. Little or no vitrification occurs in the method of the present invention, and the silica remains substantially crystalline or microcrystalline throughout the manufacturing process.

For infiltration within the scope of the present method, a wider variety of precursors which transform, for example by decomposition upon heating, to a ceramic phase, is suitable. Generally they are classified as organometallics, sol gels or metal salts. The following Table I identifies specific forms of such precursors.

TABLE I

| | CERAMIC PRECURSORS | | | |
|---|---|---|---|---|
| NAME | ONE SOURCE | FORM | CERAMIC PHASE AFTER TRANSFORMATION | CONDITION |
| vinylic polysilane | Dow Chemical | liquid | $SiO_2$ | amorphous |
| dimethyl siloxane | Owens Illinois | solid | $SiO_2$ | amorphous |
| hafnium oxychloride hexahydrate | CERAC | solid | $HfO_2$ | crystalline |
| mono aluminum phosphate | Calgary | liquid | $Al(PO_4)_3$ | crystalline |
| aluminum isopropoxide | Fisher | solid | $Al_2O_3$ | amorphous |
| tetra ethyl ortho silicate | Fisher | liquid | $SiO_2$ | amorphous |

The use of rigid binders in the manufacture of ceramic and ceramic composite materials is common. Such binders typically fix ceramic particles and reinforcing fibers in position to facilitate handling prior to sintering or vitrification. Relative motion between ceramic particles and reinforcing fibers is specifically avoided. However, in the present invention binders serve a substantially different function. In the present invention silicone resins are used as binders; these resins can be softened and made to flow by the application of moderate heat and pressure. Accordingly, ceramic particles which will subsequently be incorporated in a ceramic matrix can be made to flow around and between ceramic reinforcing fibers, thereby eliminating massive voids which might otherwise occur while laying up ceramic matrix composite articles. Additional polymer materials, such as epoxy resins, may be intermixed or copolymerized with the silicone resins to improve the flow of the polymer substance. Silicone resins transform during heating at higher temperatures in an oxidizing atmosphere to yield silica, while any other polymer material will burn to yield only gaseous products. Thus, a single polymer substance can provide the dual functions of binder to support the ceramic particles and reinforcing fibers and precursor to a ceramic matrix phase.

According to the method of the present invention, discontinuous material, comprising the ceramic particles, and a polymeric substance such as a silicone resin are suspended or dissolved in a liquid vehicle to provide a matrix mixture slurry. As used herein, the term "discontinuous material" is intended to mean powder, particles, small fragments, flakes of material, whiskers, etc. A characteristic of the vehicle of the slurry is that it be compatible with the ceramic particles and the polymeric substance, and preferably, a solvent for the latter. This allows a substantially uniform distribution of the polymeric substance and ceramic particles in the vehicle to provide the matrix mixture. The vehicle is typically an organic solvent, such as, for example, ethyl alcohol, trichlorethane, methyl alcohol, toluene and methyl ethyl ketone, which allows the polymer substance to dissolve into a solution. The quantity of solvent required depends upon the solubility and saturation limit of the polymer substance and the desired viscosity of the slurry. While greater or lesser amounts of vehicle are suitable for specific applications, the preferred limits range from about 20 to about 30 weight percent vehicle in the slurry. Lower amounts of vehicle generally do not provide sufficient fluidity and wettability in the slurry; additional quantities of vehicle only induce prolonged drying times to evaporate the excess solvents.

In respect to the ceramic particles in the slurry, it has been recognized that such particles should be included in the range of about 40 weight percent up to about 90 weight percent of the sum of ceramic particles and polymer substance. At 40 weight percent or less, there is insufficient ceramic to provide a matrix about reinforcing fibers in the composite member and results in too much porosity; at greater than about 90 weight percent, there is insufficient bonding, by the ceramic phase resulting from transformation of the polymer substance, to properly secure the ceramic particles about the reinforcing fibers. The preferred range for the ceramic particles in that sum is 50 to 80 weight percent, and more specifically about 70 to 80 weight percent.

In the matrix mixture slurry, it has been recognized that the polymer substance should be included in the range of about 10 to about 60 weight percent of the sum of polymer substance and ceramic particles, preferably 10 to 30 weight percent, to provide adequate flow and bonding. Less than about 10 weight percent provides insufficient ceramic phase for flow and bonding together the ceramic particles after transformation; at greater than about 40 weight percent, decomposition of the polymer substance results in excessive porosity in the matrix phase. Examples of silicones which can be used as polymer substances are polysiloxane (GE), RTV (Dow Corning) and polycarbosilane (Union Carbide). The preferred embodiment of the present invention utilizes silicone resins which include the siloxane group:

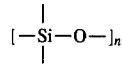

Additional polymer substance can be included up to about 20 weight percent of the sum of ceramic particles and polymer substances. Greater than that will result in too much porosity. Epoxy resins, for example general purpose epoxy resin manufactured by Ciba-Geigy, have been used for this purpose. Included as required were dispersants such as glycerol trioleate, marine oil, adipate polyester, sodium polyacrylate and phosphate ester. When epoxy resin was used in this method, the preferred amount of epoxy was about 1 to about 10 weight percent, in respect to the mixture of total polymer substance and ceramic particles.

Evaluated in connection with the present invention were a variety of ceramic reinforcement fibers including those shown in the following Table II, along with each of their coefficients of thermal expansion (CTE):

TABLE II

| REINFORCEMENT FIBERS | |
|---|---|
| TYPE | CTE ($10^{-6}$ per °C.) |
| A. MONOFILAMENTS | |
| Sapphire | 7 to 9 |
| Textron SCS-6 | 4.8 |
| Sigma | 4.8 |
| B. ROVINGS/YARN | |
| Nextel 440 | 4.4 |
| Nextel 480 | 4.4 |
| Sumitomo | 8.8 |
| DuPont FP | 7.0 |
| DuPont PRD-166 | 9.0 |
| UBE | 3.1 |
| Nicalon | 3.1 |
| C. CHOPPED FIBERS/WHISKERS | |
| Nextel 440 | 4.4 |
| Saffil | 8.0 |

In an Example 1 evaluated in connection with the present invention, the matrix mixture slurry included $Al_2O_3$ particles in the size range of about 0.2 to 50 microns as the ceramic particles, and a mixture of dimethyl siloxane (Table I) and a general purpose epoxy resin produced by Ciba-Geigy as the polymer substance. In this typical mixture, by weight, $Al_2O_3$ was 70 to 80 percent, silicone was 10 to 30 percent and epoxy was 1 to 10 percent of the sum of $Al_2O_3$, silicone and epoxy. With this mixture was the combination solvent 70 percent by volume trichloroethane and 30 percent ethanol as the vehicle in the amount of about 20 to 30 weight percent, the balance, 70 to 80 weight percent, being the above mixture of ceramic particles and polymer substance to provide the matrix mixture slurry.

In a related Example 2, a separate ceramic precursor was included. Such mixture included, by weight, 70 to 80 percent $Al_2O_3$ as the ceramic particles, 5 to 15 percent aluminum isopropoxide as the ceramic precursor, 5 to 15 percent dimethyl siloxane and epoxy in the amount of 1 to 10 percent of the sum of ceramic particles, precursor and polymer substance. With this mixture was the combination solvent 70 percent trichloroethane and 30 percent ethanol as the vehicle in the amount of about 20 to 30 weight percent, the balance, 70 to 80 weight percent, being the mixture of ceramic, precursor and polymer substance to provide the matrix mixture slurry.

In one form of the method of the present invention, each of the matrix mixture slurries of Examples 1 and 2 above was interspersed about reinforcing ceramic fibers in the form of a fabric. In these examples, the reinforcing fibers were made of the Sumitomo yarn or rovings identified above, included in the range of 20 to 40 volume percent of the member. In other forms and examples, the reinforcing ceramic fibers were filament wound. In the present invention, it has been recognized that the reinforcing fibers be included in the range of about 10 to 50 volume percent of the member, and preferably 30 to 40 percent. Less than about 10 volume percent provides insufficient reinforcement strength, and at greater than about 50 volume percent the fibers are spaced too closely for the disposition about them of adequate matrix material.

After allowing this prepreg to dry, to enable the majority of the solvent to be evaporated, the prepreg plies thus created were shaped and molded into a member, such as through use of compression molds, or an autoclave, to apply temperature and pressure, as is well known and practiced in the art of polymer matrix composite materials. During this portion of the process, the binder flowed into void spaces between the reinforcing fibers, allowing the ceramic matrix to be more uniformly distributed around the fibers. Thereafter, the member was cooled into a solid preform shape.

The preform was then heated at a processing temperature in the range of about 600° to about 1000° C. rather than at the generally much higher sintering temperature used in known methods, for example in the range of about 1300° to about 1650° C. This heating is conducted to remove organics such as any additional polymer substance such as an epoxy and to transform through decomposition, the silicone polymer substance into a ceramic bonding phase or phases. Through practice of the present invention of including a suitable polymer substance with the ceramic particles, the processing temperature can be maintained in a range much lower than that required to sinter together ceramic particles about reinforcement fibers. Also, it enables use of fibers which otherwise would be degraded or thermochemically damaged at the known, higher sintering temperatures. Also, the lower processing temperature reduces the extent of vitrification of the bonding material, and the extent of damage to the reinforcing fibers by the vitrified bonding material.

In the above Examples 1 and 2, heating at the processing temperature was conducted in the range of about 600° to 800° C. Such heating results in a ceramic matrix of ceramic particles bonded together through a ceramic phase or phases. Generally the matrix has an open porosity in the range of about 5 to 30 volume percent.

The present invention, in another form, includes additional steps for controlling such porosity. In such form, a ceramic precursor in liquid form, or dispersed in a vehicle generally in high concentration, is applied to the above described ceramic matrix and infiltrated into the porosity. For example, the matrix can be immersed in the liquid ceramic precursor infiltrant and a vacuum applied to facilitate precursor penetration into the pores. After drying, the infiltrated matrix is heated, as described above, to transform the infiltrant ceramic precursor into a ceramic phase or phases thereby reducing certain porosity. Such pore infiltration and transformation heating can be repeated, as desired, to reduce or eliminate porosity from the matrix to a desired level. However, as one of the objects of the present invention is a method to produce a composite member having a controlled amount of porosity in its matrix, such infiltration is preferably employed for reducing porosity to a predetermined level. The graphical comparison of FIG. 1 is a stress versus strain curve which shows the fracture resistance and toughness of the member made according to the present invention. The data in this FIG. 1 were obtained by testing at room temperature. The specimens used were 0.5"×6"× 0.1" rectangular test bars. The data represented by curve 1 was from testing of a specimen made from the mixture of the above Example 1, as described, without dispersing the slurry about reinforcing fibers. The material in curve 1 is a monolithic matrix of ceramic particles, ceramic precursor and epoxy binder which is low in strength and fails catastrophically in a brittle manner. Monolithic ceramics of this type are not viable candidates for critical shapes in structural applications due to their intolerance to defects and subsequent low toughness.

The data represented by curve 2 of FIG. 1 was from testing of a specimen of the same size and shape as that used for curve 1 data, made from that same mixture. However, the mixture was interspersed about a reinforcing fiber fabric of Sumitomo yarn included at about 30 volume percent of the member. The material in curve 2 is a ceramic composite in which the same monolithic matrix material in curve 1 has been incorporated throughout and around the fiber reinforcements. The material has high strength because the load is now transferred to the high strength fibers and the material exhibits graceful fracture and toughness. This type of composite behavior allows a part to have extended life after the initial onset of fracture.

As can be seen from FIG. 1, the reinforced ceramic matrix composite member of curve 2 is significantly stronger and tougher than that of curve 1. In particular, the reinforced ceramic matrix composite member represented by curve 2 withstood a stress of about 20 ksi for a strain of about 0.2 percent, and exhibited an ultimate tensile strength in excess of about 35 ksi and a percent elongation at failure in excess of about 0.4 percent.

Included for comparison in FIG. 1 is a curve 3 representing use of sapphire reinforcing fibers in a matrix of $Al_2O_3$ and sintered at about 1450° to 1500° C., well above the temperature capability of the fibers identified in Table II. No precursor was included in such a composite, which was 55 volume percent aluminosilicate and 45 volume percent sapphire fibers. Accordingly, this mixture necessitated use of the sintering, consolidation temperature significantly higher than the processing temperature used in the method of the present invention, generally about 600° to 1000° C. The material in curve 3 exhibits higher strength than curve 2 with tough behavior. These improved properties represent the benefits of using a higher strength reinforcing fiber with a thermally compatible matrix to enable load transfer from the matrix to the fiber in an efficient manner.

As can be seen from the comparison of curve 2, representing the present invention, and curve 3, representing a member made by a different method, the present invention provides a high strength, tough, reinforced ceramic composite made without ultra high temperature consolidation processing. This occurs through use, in the present invention, of a polymer substance which decomposes at a lower temperature to a ceramic phase which bonds together the ceramic particles and reinforcing fibers into a composite member.

Figure 2:
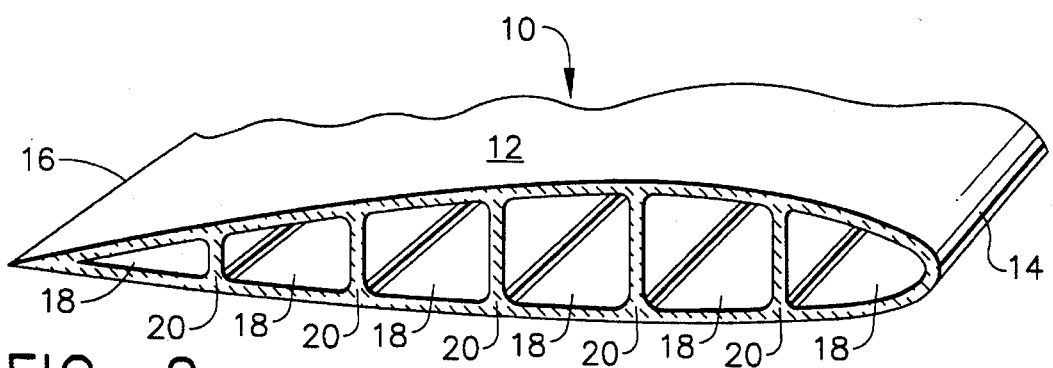
FIG. 2 is a fragmentary, sectional perspective view of a portion of a gas turbine engine strut.

Typical of members which can be made according to the present invention is an airfoil shaped strut, useful in a gas turbine engine hot section, and shown in the fragmentary, sectional perspective view of FIG. 2. The strut, shown generally at 10, includes a strut body 12 having leading edge 14 and trailing edge 16. Strut 10 is sometimes referred to as a hollow strut because of the presence of a plurality of cavities 18 therein separated by ribs 20.

Figure 3:
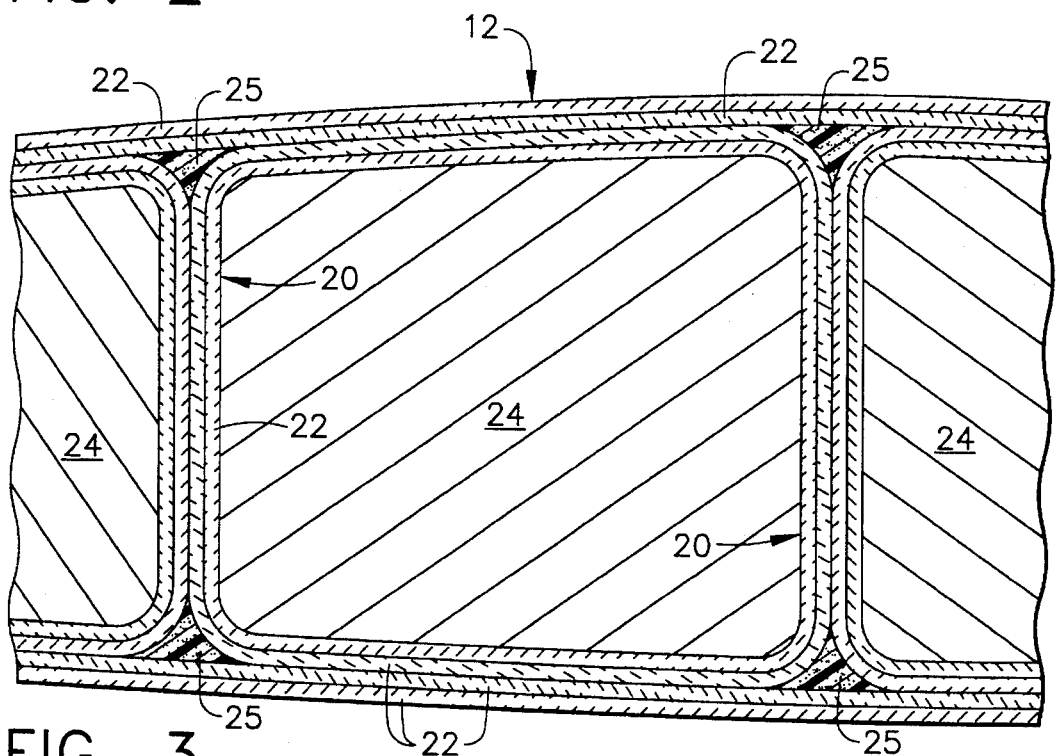
FIG. 3 is a fragmentary, diagrammatic sectional view of plies of ceramic matrix composite disposed about forming blocks.

Strut 10 can be made by providing a plurality of plies such as laminations, sheets, tape, etc., made as described above. The fragmentary sectional view of FIG. 3 is diagrammatic and representative of disposition of such plies, identified at 22, about forming blocks 24, such as of aluminum, as an initial formation of the preform configuration of a portion of the strut of FIG. 2 in relation to the shape of that finished strut. In reality, each ply for this member will have a thickness dependent on fiber and form, as is well known in the art. For example, typical thicknesses are in the range of about 0.008 to 0.020 inches. However, as is well known in the art, the number of plies actually required to provide such a laminated structure would be many more than those presented for simplicity in FIG. 3. Additional individual fibers 25 are disposed between plies within potential spaces between plies at the edge curvature regions of blocks 24 to reduce voids.

Figure 4:
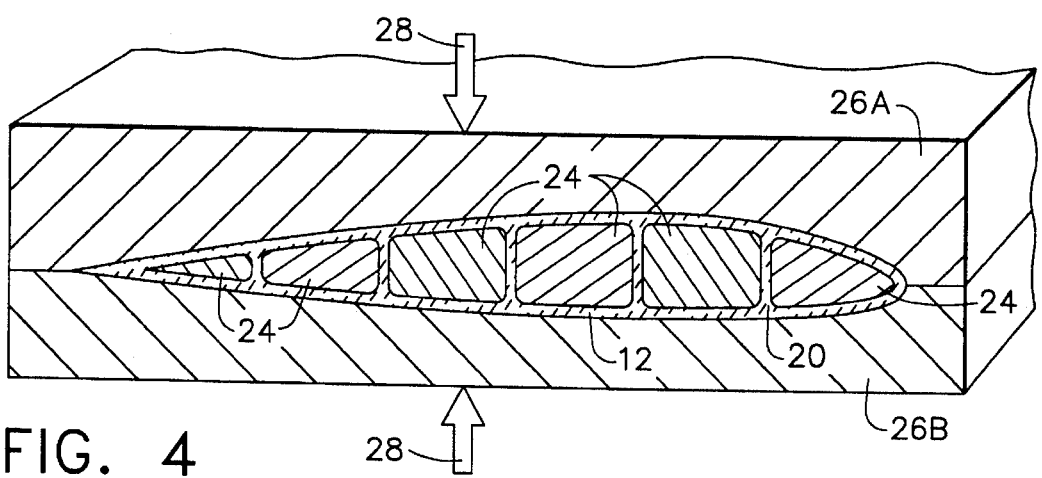
FIG. 4 is a fragmentary, sectional perspective view of the member of FIG. 3 disposed in forming die portions.

After formation of the member of FIG. 3 assembled about forming blocks 24, the assembly is placed within appropriately shaped, mating forming dies 26A and 26B in FIG. 4 for the purpose of laminating the member into an article preform. Typically, a pressure, represented by arrows 28, in the range of about 150 to 1000 pounds per square inch, is applied to the member while it is heated, for example in the range of 150° to 400° C., for a time adequate to allow proper lamination to occur. Such a temperature is not adequate to enable consolidation of the materials of construction to occur.

After lamination, the preform thus provided is removed from the forming dies and the forming blocks are removed. The preform then is placed in a furnace, and heated to a temperature below 1000° C. in a controlled manner to remove additional polymer substances, and then to a processing temperature at which no degradation of fibers occurs, such as 1000° C. or above to transform the silicone resin in the preform to yield silica, thereby forming the ceramic matrix composite article of FIG. 2.

The cross referenced related U.S. patent application Ser. No. 07/341,001, filed by the inventors of the present application and assigned to the assignee hereof, now abandoned, and subsequently issued as U.S. Pat. No. 5,306,554, under a continuation U.S. patent application Ser. No. 07/866,994, addresses the problems of shrinkage of consolidated ceramic particles and porosity attributed to gaseous products of the transformation. According to the invention of the cross referenced application, such shrinkage is counteracted by mixing with the ceramic particles, prior to consolidation, particles of an inorganic filler which will exhibit net expansion relative to the ceramic particles during heating to the consolidation temperature. Tested in the evaluation of that invention are the inorganic filler materials, of lathy-type crystal shape, and identified in the following Table III.

TABLE III

| FILLER MATERIALS | | |
|---|---|---|
| IDENTIFICATION | | |
| MINERAL-OGICAL NAME | COMPOSITION | LATHY-TYPE CRYSTAL SHAPE |
| Pyrophyllite | $Al_2O_3.4SiO_2.H_2O$ | laminar |
| Wollastonite | $CaO.SiO_2$ | bladed/elongated with circular crystals |
| Mica | $K_2O.3Al_2O_3.6SiO_2.2H_2O$ | plate-like |
| Talc | $3MgO.4SiO_2.H_2O$ | flat flake |
| Montmorillonite | $(Al,Fe,Mg)O_2.4SiO_2.H_2O$ | elongated |
| Kyanite | $3Al_2O_3.3SiO_2$ | bladed/elongated |

Such filler materials can be used in one form of the present invention to counteract porosity created during heating at the processing temperature. The proportion of the filler in that above mixture is selected so that expansion of the filler counteracts and controls the amount of such porosity, however generated.

When the inorganic filler of the related application is included in the matrix mixture of the present invention, such filler can be included in an amount, for example up to about 50 weight percent of the sum of ceramic particles, polymer substance and filler. The proportion is selected so that expansion of the filler counteracts shrinkage and porosity, which could result from shrinkage of the ceramic particles but primarily occurs at the lower processing temperature from transformation or volume change of materials during heating of the preform of the present invention in an oxidizing atmosphere, as has been described herein. Typically, the porosity control mixture of ceramic particles and filler will be, by weight, about 50 to about 93 percent ceramic particles and about 7 to about 50 percent inorganic filler, with the porosity control mixture representing, by weight, about 40 percent to about 90 percent of the matrix mixture of ceramic particles and polymer substance. Preferred as inorganic filler materials are those shown in the above Table III, and having a lathy-type crystal shape. In particular, pyrophyllite and wollastonite have been found to be especially useful as fillers. Also, as described in the disclosure of the related application, reinforcing fibers which will expand relative to the matrix mixture enhance the capability of processing the preform at ambient pressure.

The preferred amount of porosity in the matrix of the composite material is between about 10 and about 40 percent by volume, preferably about 20 percent. This range is appropriate to control the effective strength of the matrix-to-reinforcing fiber bond, yet provide sufficient matrix strength so that the transverse strength of the composite material is high enough to be provide useful articles. It is important that such porosity be fine and uniformly distributed, and not massive voids that may result from nonuniform interspersing of the matrix material around the reinforcing fibers. That the porosity be interconnected and surface connected is useful if it becomes appropriate to infiltrate the matrix to control the amount of porosity.

The present invention has been described in connection with typical, though not limiting, examples and embodiments, and their related data. However, those skilled in the art will readily recognize that the present invention is capable of a variety of modifications and variations within the scope of the appended claims. For example, it is recognized that a mixture of particles of several different substances might be advantageously used as the ceramic material described herein; similarly, there might be a plurality of substances described and comprehended by the singular terms polymer substance, or filler, or vehicle. Also, although the molded preform is utilized within the present invention primarily as an intermediate step in the manufacture of a ceramic matrix composite member, such molded preforms made according to the present method have considerable strength and may be advantageously utilized for certain applications without subsequent heating to transform the polymer substance.

We claim:

1. A method of making a fiber-reinforced composite member having a ceramic matrix characterized by open porosity uniformly distributed therein so as to control the strength of a matrix-to-fiber bond between the ceramic matrix and reinforcing fibers within the fiber-reinforced composite member, the method comprising the steps of:

mixing a polymer substance, inorganic particles and a quantity of ceramic particles to form a matrix mixture slurry, the inorganic particles constituting a particulate inorganic filler which exhibits net expansion relative to the ceramic particles when heated, the polymer substance, the ceramic particles and the inorganic particles being combined in proportions that yield the open porosity in the ceramic matrix following a subsequent heating step in which the polymer substance is transformed to a substantially crystalline ceramic phase that constitutes a portion of the ceramic matrix;

interspersing the matrix mixture slurry about oxidation-stable reinforcing fibers to form a body; and heating the body so as to produce the fiber-reinforced composite member, the heating step being conducted in an oxidizing atmosphere so as to transform the polymer substance to yield the substantially crystalline ceramic phase and produce the open porosity uniformly distributed within the ceramic matrix, the substantially crystalline ceramic phase and the ceramic particles forming the ceramic matrix such that the substantially crystalline ceramic phase bonds the ceramic particles to the reinforcing fibers, the open porosity of the ceramic matrix being generated in an amount sufficient to control the strength of the matrix-to-fiber bond between the ceramic matrix and the reinforcing fibers such that the load-carrying characteristic of the fiber-reinforced composite member is characterized as being fiber-dominated and not matrix-dominated.

2. The method of claim 1 in which:

the matrix mixture slurry comprises, by weight:
a) a vehicle, as an organic liquid, in a range from about 20 percent to about 30 percent of the matrix mixture slurry; and
b) a mixture composed of, by weight, about 40 percent to about 90 percent of the ceramic particles and the inorganic particles combined, and about 10 percent to about 60 percent of the polymer substance; and the reinforcing fibers constitute about 10 to about 50 percent by volume of the body.

3. The method of claim 2 in which the polymer substance is comprised of a silicone resin.

4. The method of claim 3 in which the silicone resin is comprised of a plurality of siloxane groups.

5. The method of claim 2 in which the substantially crystalline ceramic phase produced by transformation of the polymer substance is substantially silica.

6. The method of claim 2 in which the ceramic particles are comprised of material selected from the group consisting of oxides of Al, Si, Y, Zr, compounds therebetween, and mixtures and combinations thereof.

7. The method of claim 2 in which the reinforcing fibers are ceramic fibers.

8. The method of claim 1, including the additional step of molding the body into a polymer composite member at an elevated temperature and a pressure at which the polymer substance flows, the polymer composite member thereafter yielding the fiber-reinforced composite member upon further heating in the oxidizing atmosphere during which the polymer substance is transformed to yield the substantially crystalline ceramic phase and produce the open porosity within the ceramic matrix.

9. The method of claim 1 in which the amount of porosity in the ceramic matrix, by volume thereof, is from about 10 percent to about 40 percent.

10. The method of claim 1 in which the oxidizing atmosphere is air.

11. The method of claim 1 in which the heating step is conducted at a temperature of about 600° C. to about 1400° C.

12. The method of claim 1 in which the body is provided in the form of a prepreg ply made by a method comprising the steps of:

providing the reinforcing fibers in the form of a ply; and interspersing the matrix mixture slurry about the reinforcing fibers in the ply.

13. The method of claim 12 in which the body is provided in the form of a plurality of prepreg plies disposed in predetermined positions.

14. The method of claim 1 for making the fiber-reinforced composite member in a higher density in which:

after heating the body in the oxidizing atmosphere to transform the polymer substance to yield the substantially crystalline ceramic phase, the fiber-reinforced composite member is exposed to a ceramic infiltrant precursor which infiltrates open structure in the fiber-reinforced composite member so as to form an infiltrated member; and thereafter heating the infiltrated member in an oxidizing atmosphere to transform the ceramic infiltrant precursor to yield a ceramic phase.

15. The method of claim 1 in which the proportion of the particulate inorganic filler in the matrix mixture slurry is selected so that expansion of the particulate inorganic filler counteracts, to a preselected extent, shrinkage occurring in the body during the heating step.

16. The method of claim 15 in which the particulate inorganic filler is selected from the group consisting of pyrophyllite, wollastonite, mica, talc, kyanite and montmorillonite.

17. The method of claim 16 in which:

the matrix mixture slurry comprises, by weight:
a) a vehicle, as an organic liquid, in the range from about 20 percent to about 30 percent of the matrix mixture slurry; and
b) a mixture of by weight:
about 40 percent to about 90 percent of a particulate matter comprising about 50 percent to about 93 percent of the ceramic particles and about 7 percent to about 50 percent of the particulate inorganic filler; and
about 10 percent to about 60 percent of the polymer substance; and the reinforcing fibers constitute about 10 to about 50 percent by volume of the body.

18. A method of making a fiber-reinforced composite member having a ceramic matrix characterized by open porosity uniformly distributed therein so as to control the strength of a matrix-to-fiber bond between the ceramic matrix and reinforcing fibers within the fiber-reinforced composite member, the method comprising the steps of:

- mixing a polymer substance and a quantity of ceramic particles to form a matrix mixture slurry, the polymer substance being comprised of a silicone resin and a silicon-free resin, the polymer substance being admixed into the matrix mixture slurry so as to yield the open porosity in the ceramic matrix following a subsequent heating step in which the polymer substance is transformed to a substantially crystalline ceramic phase that constitutes a portion of the ceramic matrix;
- interspersing the matrix mixture slurry about oxidation-stable reinforcing fibers to form a body; and
- heating the body so as to produce the fiber-reinforced composite member, the heating step being conducted in an oxidizing atmosphere so as to transform the polymer substance to yield the substantially crystalline ceramic phase and produce the open porosity uniformly distributed within the ceramic matrix, the substantially crystalline ceramic phase and the ceramic particles forming the ceramic matrix such that the substantially crystalline ceramic phase bonds the ceramic particles to the reinforcing fibers, the open porosity of the ceramic matrix being generated in an amount sufficient to control the strength of the matrix-to-fiber bond between the ceramic matrix and the reinforcing fibers such that the load-carrying characteristic of the fiber-reinforced composite member is characterized as being fiber-dominated and not matrix-dominated.

\* \* \* \* \*